(12) United States Patent
Drzymala et al.

(10) Patent No.: US 12,443,818 B2
(45) Date of Patent: Oct. 14, 2025

(54) SCAN MAT

(71) Applicant: ZEBRA TECHNOLOGIES CORPORATION, Lincolnshire, IL (US)

(72) Inventors: Mark Drzymala, Saint James, NY (US); Edward Barkan, Miller Place, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/228,636

(22) Filed: Jul. 31, 2023

(65) Prior Publication Data

US 2025/0045551 A1 Feb. 6, 2025

(51) Int. Cl.
*G06K 19/06* (2006.01)
*G06K 7/10* (2006.01)

(52) U.S. Cl.
CPC ... *G06K 19/06037* (2013.01); *G06K 7/10732* (2013.01); *G06K 7/1095* (2013.01); *G06K 7/1097* (2013.01); *G06K 7/1098* (2013.01); *G06K 7/10158* (2013.01)

(58) Field of Classification Search
CPC ......... G06K 19/06037; G06K 7/10732; G06K 7/1095; G06K 7/1097; G06K 7/1098; G06K 7/10158
See application file for complete search history.

(56) References Cited

U.S. PATENT DOCUMENTS

| 2010/0282850 | A1* | 11/2010 | Olmstead | G06K 7/10722 |
| | | | | 235/440 |
| 2014/0061305 | A1* | 3/2014 | Nahill | G06K 7/0095 |
| | | | | 235/438 |
| 2017/0337456 | A1* | 11/2017 | Chang | G09G 3/3208 |
| 2019/0156325 | A1* | 5/2019 | Kim | H04W 4/80 |

* cited by examiner

*Primary Examiner* — Matthew Mikels
(74) *Attorney, Agent, or Firm* — Yuri Astvatsaturov

(57) ABSTRACT

Imaging devices are provided having a low-profile substrate structure with a mounting surface that can be removably placed on flat work surface. Further, a low-profile frame structure coincides with a peripheral region of that substrate structure and contains a plurality of imagers, at least some of which are on opposing sides of the substrate structure. The opposing imagers are positioned such that the respective fields of view are inwardly facing toward a central region of an upper surface and define a scan volume extending across the substrate structure and above the central region. The upper and lower bounds of the imaging device form a low-profile assembly generally accessible to scan objects moving across any direction.

39 Claims, 12 Drawing Sheets

SCAN MAT

BACKGROUND

Bi-optic readers are commonly used for reading barcodes and other indicia on items scanned across one or more fields of view of the reader. Various bi-optic readers have internal imagers capable of defining a volumetric field of view that allows for efficient item scanning, by establishing both vertically and horizontally extending fields of view that collectively define a scan volume. However, bi-optical readers, along with other images, limit a user's physical access to that scan volume and thus limit efficient operation of the reader. Bi-optic readers, for example, while capable of defining a complex volumetric field of view are, nonetheless, orientation specific, meaning that where a user is positioned affects their access. That limits both how bi-optic readers are deployed and the ease with which an object can be scanned. For example, bi-optic readers typically have access from one side, and not another.

In addition to their access limitations, bi-optic readers have large footprints. These readers are formed of platter and accompanying tower assemblies that, while useful in generating scanning regions and accessible for servicing and replacement, require a considerable amount of space. The platter assembly extends well below a work surface, and the tower assembly extends well above.

Accordingly, there is a need for an entirely new scanner modality that offers a tailorable scan region and ease of access to that scan region.

SUMMARY

In accordance with an aspect, an imaging device includes a low-profile substrate structure having a mounting surface to be placed on a substantially flat work surface and having an upper surface, opposite the mounting surface, the upper surface having a central region positioned for scanning of an object. A low-profile frame structure coincides with a peripheral region of the low-profile substrate structure. That low-profile frame structure includes a plurality of imagers each having a respective field of view. Further, the low-profile frame structure positions each imager such that each respective field of view is inwardly facing toward the central region of the upper surface and such that a scan volume extending above the central region is defined from the overlapping respective fields of view. Further still, the low-profile frame structure positions at least some of the plurality of imagers at opposing sides of the low-profile substrate structure. The mounting surface of the low-profile substrate structure and an upper bound of the low-profile frame structure define an upper bound and a lower bound of the imaging device.

In some examples, the low-profile frame structure positions the plurality of imagers such that the scan volume covers a majority of the upper surface centered about a center point of the central region when viewed from above the imaging device.

In some examples, the low-profile frame structure positions the plurality of imagers such that the scan volume extends substantially the length of the upper surface in a transverse direction and being confined from extending substantially the width of the upper surface in the lateral direction.

In some examples, the distance between the upper bound and the lower bound of the imaging device is less than 2 inches, and preferably less than 1 inch. Further, in some examples, the low-profile frame structure positions the plurality of imagers such that the respective field of view of each imager has a central axis that is no greater than 45° relative to the upper surface.

In some examples, the low-profile frame structure positions the plurality of imagers such that imagers on a side of the low-profile frame structure are angled with respective to one to prevent dead scan angles during object scanning over the scan volume.

In some examples, the plurality of imagers includes, at least three imagers, such as four, five, or six imagers.

In some examples, the low-profile frame structure positions the imager such that the scan volume defined by their overlapping fields of view has a lower edge or lower plane that is parallel to the upper surface at the central region. In some examples, that scan volume has a lower portion that impinges the upper surface at the central region.

In accordance with another aspect, a multifunction scanning assembly includes a scale assembly configured for recess into a countertop and the imaging device is mounted to the scale assembly. In some examples, the mounting surface of the low-profile substrate structure is mounted on receiving surfaces of that scale assembly, where the receiving surfaces define the substantially flat work surface. The scale assembly is configured for sensing weight of objects on the upper surface of the low-profile substrate structure.

In accordance with another aspect, an object scanning station includes a workstation having a lead-in surface defining a first edge of a recess region and having a lead-out surface defining a second edge of the recess region opposite the first edge; and an imaging device recessed within the recess region. The imaging device includes a substrate structure having a bottom surface placed on a support of the recess region and having an upper surface opposite the bottom surface and having a peripheral region, the upper surface having a central region, the upper surface being substantially flush with the lead-in surface and the lead-out surface. The imaging device further includes a low-profile frame structure coinciding with the peripheral region and comprising a plurality of imagers each having a respective field of view (FOV), the low-profile frame structure positioning each imager such that each respective FOV is inwardly facing toward the central region of the upper surface and such that a scan volume extending above the central region is defined from overlapping respective FOVs, where the low-profile frame structure positions at least some of the plurality of imagers at opposing sides of the low-profile substrate structure.

In accordance with another aspect, a low-profile imaging device includes a substrate structure having an upper surface having a central region facing a scanning region, the substrate structure further having a peripheral region. The imaging device further includes a plurality of housing structures positioned at the peripheral region, each housing structure housing an imager having a field of view (FOV), the plurality of housing structures positioning the imagers inwardly facing toward the central region and such that the FOV of each imager overlaps with at least one of FOV of another imager, wherein the housing structures are sized such that an upper bound of each housing structure or an upper bound of each imager extends substantially the same height above a bottom surface of the substrate structure to define a uniform upper bound for the imaging device.

In accordance with another aspect, a low-profile imaging device includes a substrate structure having an upper surface having a central region facing a scanning region, the substrate structure further having a peripheral region defining at least one proximal edge and at least one distal edge opposite the proximal edge. The imaging device further includes a plurality of housing structures positioned at the peripheral region, such that at least one housing structure is positioned at the proximal edge and at least one housing structure is positioned at the distal edge, each housing structure housing an imager having a field of view (FOV), the plurality of housing structures positioning the imagers inwardly facing toward the central region and such that the FOVs overlap to form a scan volume coinciding with the scanning region and such that no FOV impinges the upper surface.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
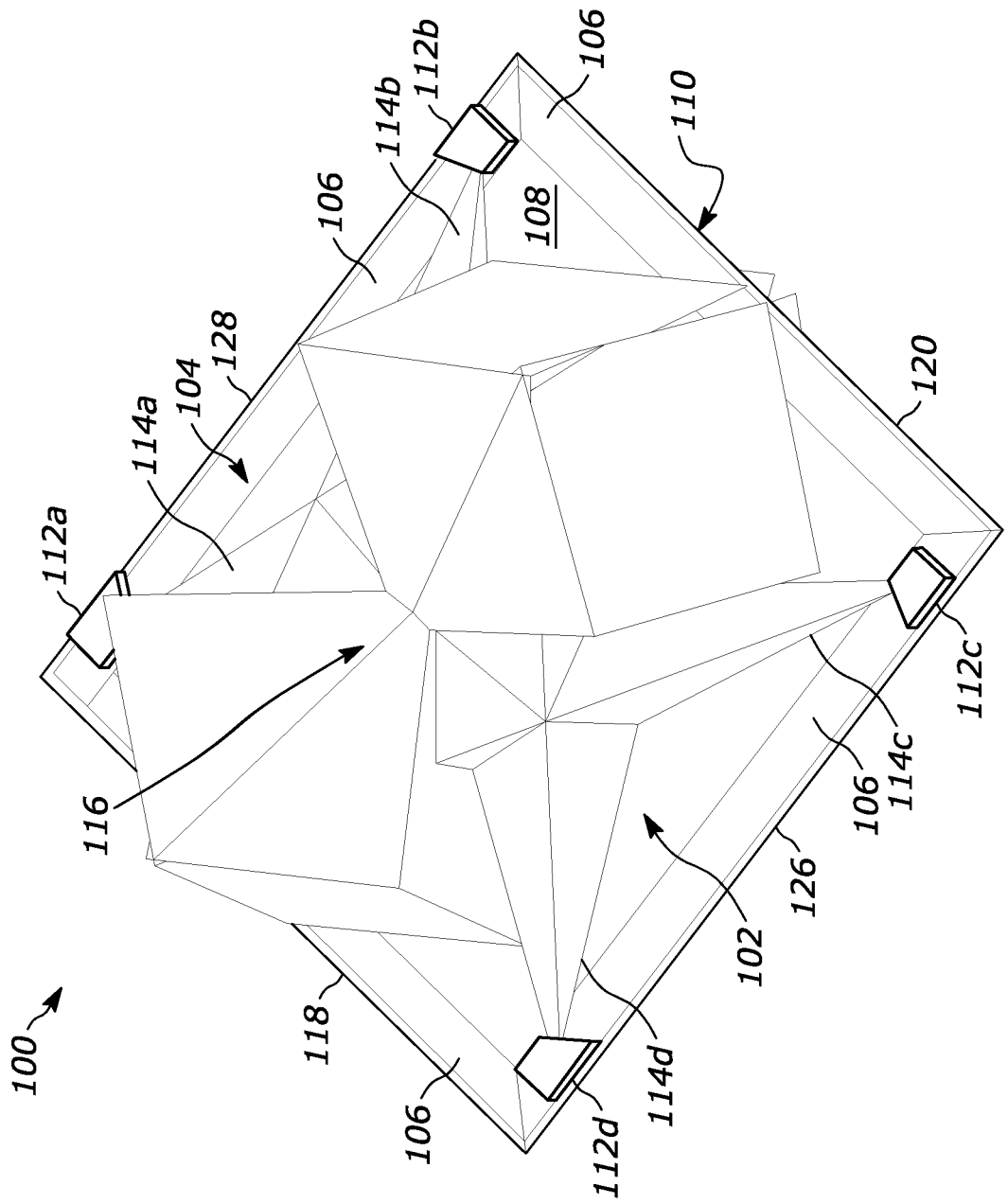
FIG. 1 illustrates a perspective view of an example low-profile imaging device having a plurality of low-profile imagers, including at least some opposing imagers, having respective fields of view that overlap to define a scan volume extending at least partially across and above a scanning surface, in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, imaging devices are provided having a low-profile to allow for greater degrees of access to a scan volume across which a user may scan an item. In particular, in examples, an upper and lower bound of the image devices establishes a low-profile that allows users on any side of the imaging device equal or near equal access to the scan volume. In this way, in various examples, the imaging devices may be orientation-independent. Further, in various examples, these imaging devices are able to be low-profile by having a low-profile substrate that has a bottom surface that can be placed on any suitable work surface, such as a flat or substantially flat work surface. Thus, advantageously, the imaging devices can be portable and mountable, thus providing an orientation-independent imaging device that can be deployed in many different types of environments. The low-profile substrate allows the imaging device to be placed on existing work surfaces, such as tabletops and countertops in retail environments, platforms and shelving in warehousing environments, and workstations in manufacturing or other machine vision environments. Thus, various imaging devices herein provide retailers a minimal structure between an operator and a customer, allowing equal or near equal access to a scan volume. The minimal structure offers a few advantages: the customer can help a cashier scan, or a checkout station can be easily used as either a self-checkout or traditional point of sale.

Further facilitating the low-profile nature of the imaging devices, a low-profile frame structure is provided that may coincide with a peripheral region of the low-profile substrate. That low-profile frame structure positions a plurality of imagers such that each respective imager field of view (FOV) is inwardly facing toward a central region of a scanning surface of the low-profile substrate. The FOVs of the imagers combine to form a scan volume that extends above an upper surface (also referred to as a scanning surface) of the substrate and covers a sufficient portion of that upper surface (when viewed from above), that a user may scan an object across that scan volume independent from (i) where the user is positioned and, at least in some examples, (ii) from the direction of scanning.

In various examples, the low-profile frame structure may position imagers such that at least some of the imagers are on opposing sides of the imaging device and define a scan volume that extends over substantially the entire upper surface. For example, the scan volume may be centered at a central region of the scanning surface, and span at least 50%, at least 60%, at least 70%, at least 80%, or at least 90% of the surface area of the upper surface, when viewed from above. In some examples, the scan volume coverage of the upper surface is determined, not by area as viewed from above per se, but by a dimensional extent of the scan volume relative to a dimensional extent of the upper surface or imaging device. For example, the low-profile frame structure may position the plurality of imagers such that the scan volume extends substantially the length of the upper surface in a transverse direction while being confined from extending substantially the width of the scanning surface in the lateral direction, the lateral direction being a primary direction of object movement during scanning.

The low-profile frame structure may be formed of individual housing structures positioned at a peripheral region of the low-profile substrate structure. While in other examples, the frame structure may be a unitary structure around entire peripheral region or other linking structures that mount multiple imagers such that the collective FOVs overlap to form a scan volume.

In various examples, low-profile imaging devices herein are formed of a substrate structure having an upper surface having a central region and a peripheral region. Housing structures may be positioned at the peripheral region, where each housing structure houses an imager inwardly facing toward the central region and such that the FOV of each imager overlaps with at least one of FOV of another imager. These housing structures are sized such that an upper bound of each extends the same height (or substantially the same height, e.g., housing structures having upper bounds within an inch of one another) above a bottom surface of the substrate structure to define a uniform upper bound for the imaging device.

In various examples, low-profile imaging devices are formed of a substrate structure having an upper surface having a central region and a peripheral region. Housing structures may be positioned at that peripheral region, such that at least one housing structure is positioned at a first edge and at least one other is positioned at a second edge diametrically opposed. In some instances, one of these edges may be proximal to a user and the opposing edge distal to that user. Further, the FOVs of the imagers overlap to form a scan volume coinciding with the scanning region and such that no FOV impinges the upper surface.

As shown in FIGS. 1-4, an imaging device 100 having a low-profile structure and designed for placement in various embodiments and in various orientations is provided. The imaging device 100 includes a low-profile substrate structure 102 and a low-profile frame structure 104, which in various examples coincides with a peripheral region 106 of the low-profile substrate structure 102. As used herein the peripheral region is a portion of the substrate structure at, abutting, or near an outermost extent thereof that, in some examples, may be region providing a perimeter around a scanning surface of the substrate structure.

As used herein, low-profile refers to a profile height defined by a lower bound of a structure (or assembly) and an upper bound of that structure (or assembly). In various examples, the term "low-profile" refers to a structure or assembly (e.g., the imaging device 100) having a height, between an upper bound and lower bound, of 5 inches or less, 4 inches of less, 3 inches or less, 2 inches or less, or 1 inch of less.

The low-profile substrate structure 102 has an upper (scanning) surface 108 above which an object may be scanned. Opposite the upper surface 108, the substrate structure 102 has a lower, bottom surface 110 (also referred to as a mounting surface, not shown) that is formed for placement on a flat or substantially flat work surface 103 (see, FIG. 2). The substrate structure 102 may be formed of a flexible or semi-flexible material, such as one or more of plastic, rubber, or silicone. In other examples, the substrate structure 102 may be rigid, e.g., comprised of plastic, sheetmetal, and/or die cast. Further still, the substrate structure 102 could also be comprised of overmolded plastic. Forming the substrate structure 102 of a flexible or semi-flexible material may decrease the weight of the imaging device 100, promote greater portability and placeability of the imaging device 100 allowing it to be moved and deployed with greater ease, etc. In other examples, the substrate structure 102 is formed as a rigid structure that maintains its shape. Further, the material of the substrate structure 102 may be material selected to promote engagement of the mounting surface 110 with a flat work surface, so that the imaging device 100 does not move after placement. Generally, the mounting surface 110 itself is flat or substantially flat, where substantially flat herein refers to being within +/−1 degree of a planar surface. In some examples, the mounting surface 110 is formed with an adhesive or 'sticky' material to promote retaining the imaging device 100 in place on a work surface. For example, such materials may be located at select locations on the mounting surface 110 or across the entire mounting surface 110. While the substrate structure 102 is shown having a square or rectangular profile (when viewed from above), it will be appreciated that the substrate structure 102 may be formed of any number of different profile shapes, including fully or partially arcuate shapes such as circular or elliptical shapes, or other polygonal shapes. The mounting surface 110 may also include locating features, such as holes, pins, or other protrusions. These locating features can interact with features on a workstation (e.g., countertop) to maintain the imaging device 100 in the correct location.

The low-profile frame structure 104 coincides with the peripheral region 106 of the low-profile substrate structure 102, for example, by extending fully around the peripheral region 106 or by being formed of housing structures at specific locations within the peripheral region 106 and may be completely or partially confined to the peripheral region 106. Further, as noted herein, an outer edge of the region 106 may be ramped such that objects being slid along a lead-in surface (e.g., countertop) can easily be dragged up onto the imaging device 100 for scanning. In some examples, the low-profile frame structure 104 may be formed of a material such as plastic, die cast, or hard rubber and may provide additional structural rigidity to the peripheral region 106 of the substrate structure 102. For example, the frame structure 104 may be formed of a rigid material or a material with greater rigidity (e.g., less twist flexibility) than that of substrate structure 102, where here greater rigidity refers 10% or higher rigidity (10% or less twist flexibility) compared to that of the substrate structure 102. In some examples, the low-profile frame structure 104 is formed of housing structures formed of the same material as the substrate structure 102.

To maintain the low-profile of the imaging device 100, while providing for a sufficiently large scan region for scanning an object, the low-profile frame structure 104 includes a plurality of imagers 112 each positioned with a respective field of view directed toward a central region of the scanning surface 108. It should be appreciated that, as used herein, the term "imager" includes any suitable structure having an imaging sensor, such as a platform scanner, imaging engine, or any imaging assembly or structure having an imaging assembly. Further, references herein to an imager may include the presence of a housing structure housing an imager.

In the illustrated example, four imagers 112a-112d are shown each positioned at a different location of the peripheral region 106 such that a respective field of view 114a-114d of the imagers is directed inwardly such that collectively the fields of view overlap to form an entire scan volume 116 extending above a central region of the scanning surface 108. In the illustrated example, the frame structure 104 positions at least some of the imagers 112 at opposing sides of the substrate structure 102. For example, imagers 112a and 112d are positioned at or near a first side (or edge) 118 of the substrate structure 102, with imagers 112b and 112c positioned at or near an opposing side (or edge) 120.

Figure 3:
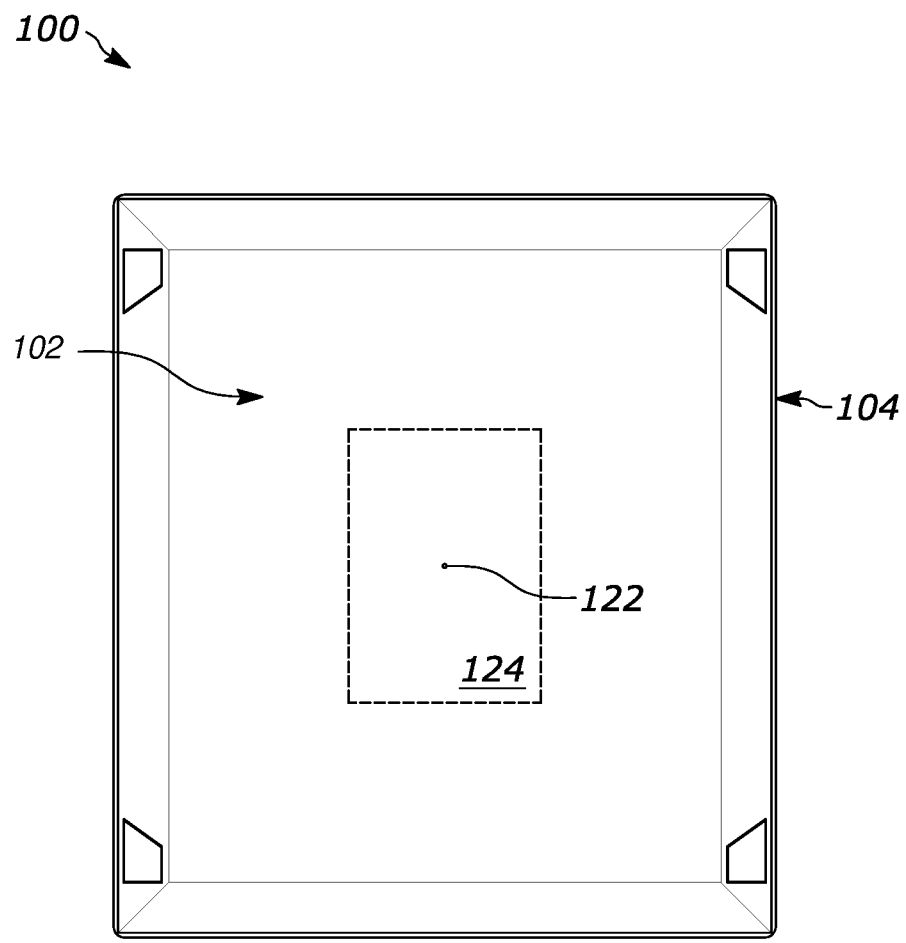
FIG. 3 illustrates another plan view of the low-profile imaging device of FIG. 1, in accordance with various embodiments.

In the illustrated example, the low-profile frame structure 104 positions the imagers 112 such that the scan volume 116 covers a majority of the scanning surface 108 and is centered about a center point 122 of the central region 124 when viewed from above the imaging device 110 (as shown in FIG. 3). The central region may be a percentage of the surface area of the substrate structure 102. A "majority" of the scanning surface 108 refers to at least over 50% of the area of the scanning surface 108 and preferably at least 60%, at least 70%, at least 80%, or at least 90%. In some examples, instead of satisfying a desired surface area coverage, the low-profile frame structure 104 positions the imagers 112 such that the scan volume 116 extends substantially the length of the scanning surface 108 in a transverse direction (i.e., from edge 118 to edge 120), while being confined from extending substantially the width of the scanning surface in the lateral direction (i.e., not extending from edge 126 to 128). Although, in some examples, the scan volume may extend substantially the width of the scanning surface in the later direction, through using wider, higher resolution FOV imagers. Having a scan volume that extends at least as substantially in the transverse direction ensures scanning of an object moved across the scanning surface 108. The extent of the scan volumes (across and/or above the scanning surface) can be determined based on the imagers, in particular the size and orientation the fields of view of the imagers, any optical windows or other structures affecting the fields of view of the imagers, the in-plane angular position (yaw) of the imagers, the out-of-plane angular position (pitch) of the imagers, the position of the imagers extending above the scanning surface or extending below the scanning surface, whether the imagers are mounted adjacent certain side edges (e.g., 126 and 128) or other side edges (e.g., 118 and 120), or other configuration factors.

Figure 2:
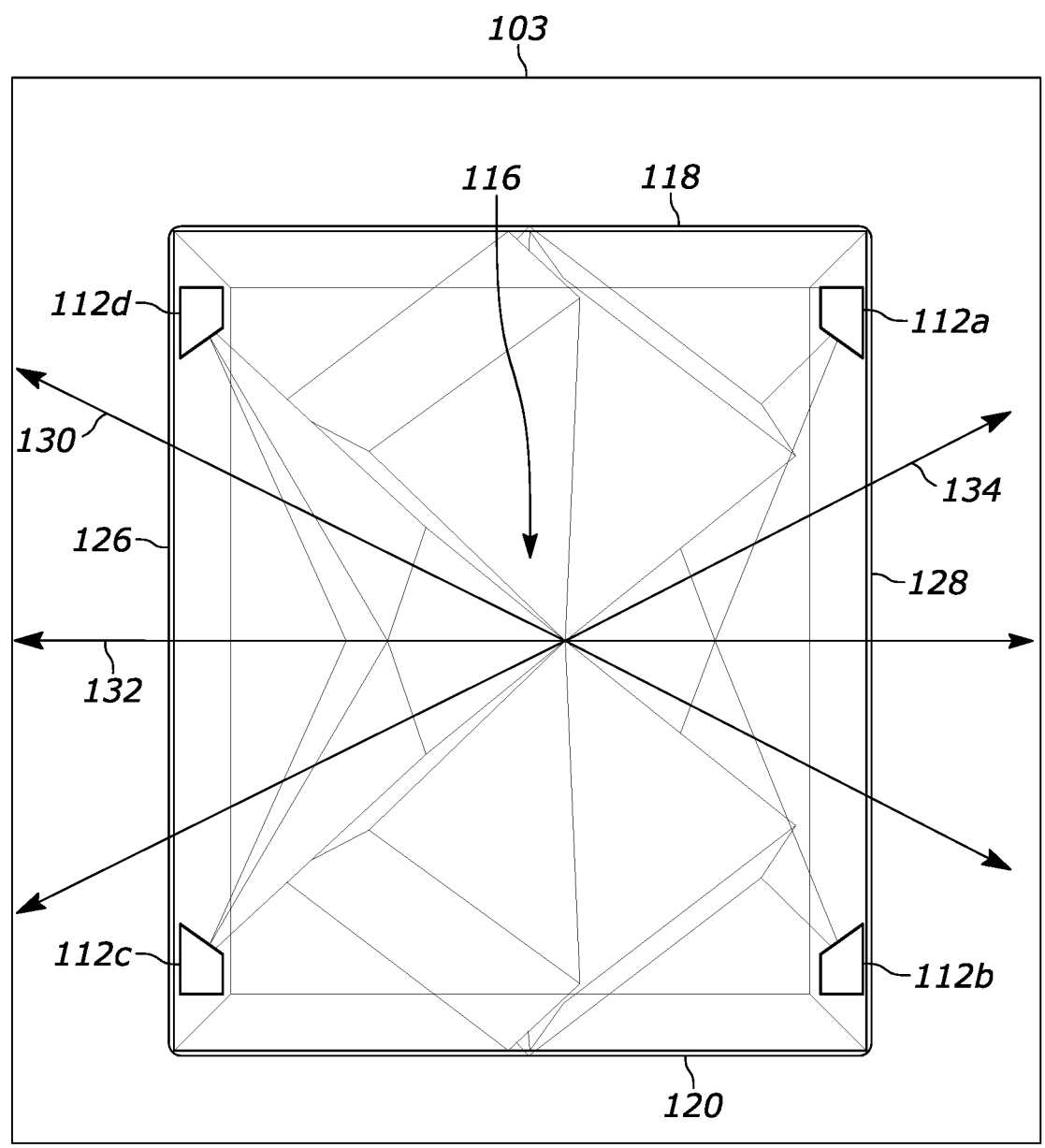
FIG. 2 illustrates a plan view of the low-profile imaging device of FIG. 1 placed on a work surface for scanning an object, in accordance with various embodiments.

As shown in FIG. 2, for example, the scan volume 116, formed from opposing inwardly facing imagers, allows the imagers to collect image data over a large range of lateral scan directions. For example, the scan volume 116 is formed to allow for scanning objects moving any of directions 130, 132, and 134, by way of example. Thus, the low-profile frame structure 104 allows for positioning the imagers 112 such that an object can be scanned at a larger range or incident directions (angles).

The frame structure 104 allows for angling the imagers 112 with respective to one to prevent dead scan angles during object scanning over the scan volume 116. For example, the scan volume 116 entirely covers (as viewed from above) the central region 124, that region defining the scan region. But further, in some examples, as an object moves across (including above) the scanning surface 108 in the desired range of directions, the object in view of the field of view of one imager, will appear in a field of view of a next imager, before that object exists the first field of view. Angling the imagers in this way can avoid dead scan angles between imagers on the same side of the imaging device 100 as well as avoiding dead scan space, at least over a desired scanning region above the scanning surface 108. Having a low-profile imaging device, formed of in-plane imagers 112 and that avoids dead scan angles and dead scan space can be particularly advantageous for scanning objects. The imaging device 100 may be designed to be fully or partially orientation independent. For example, a user standing near edge 118 has the same access to the scan volume 116 as a user standing near edge 120. This is illustrated in part by the example scan directions 130, 132, and 134 being shown as bi-directional. Irrespective of either position of a user, as a user scans an object across the scanning surface 108, the user can rotate or tilt that object, and because of the positioning and angling of the imagers, the imaging device 100 will be able to image that object while identifying for indicia or other features of object from the captured image data.

As used herein, low-profile frame structures refers to any housing structure used in facilitating mounting, recessing, or otherwise positioning imagers relative to a substrate structure for forming a scan volume. These include, but are not limited to continuous structures that connect between imagers, isolated structures that do not connect between imagers, structures resting on a substrate structure, structures sitting within one or more recesses of a substrate structure, and structures embedded within a substrate structure. These housing structures may be separate from the housing surrounding an imager or they may form the housing within which the imager is housed. For example, the imaging devices herein described has having low-profile frame structures may be implemented with imagers mounted directly onto the substrate structure, imagers recessed within recesses of the substrate structure, or embedded within the substrate structure, foregoing the use of separate frame structures.

Figure 4:
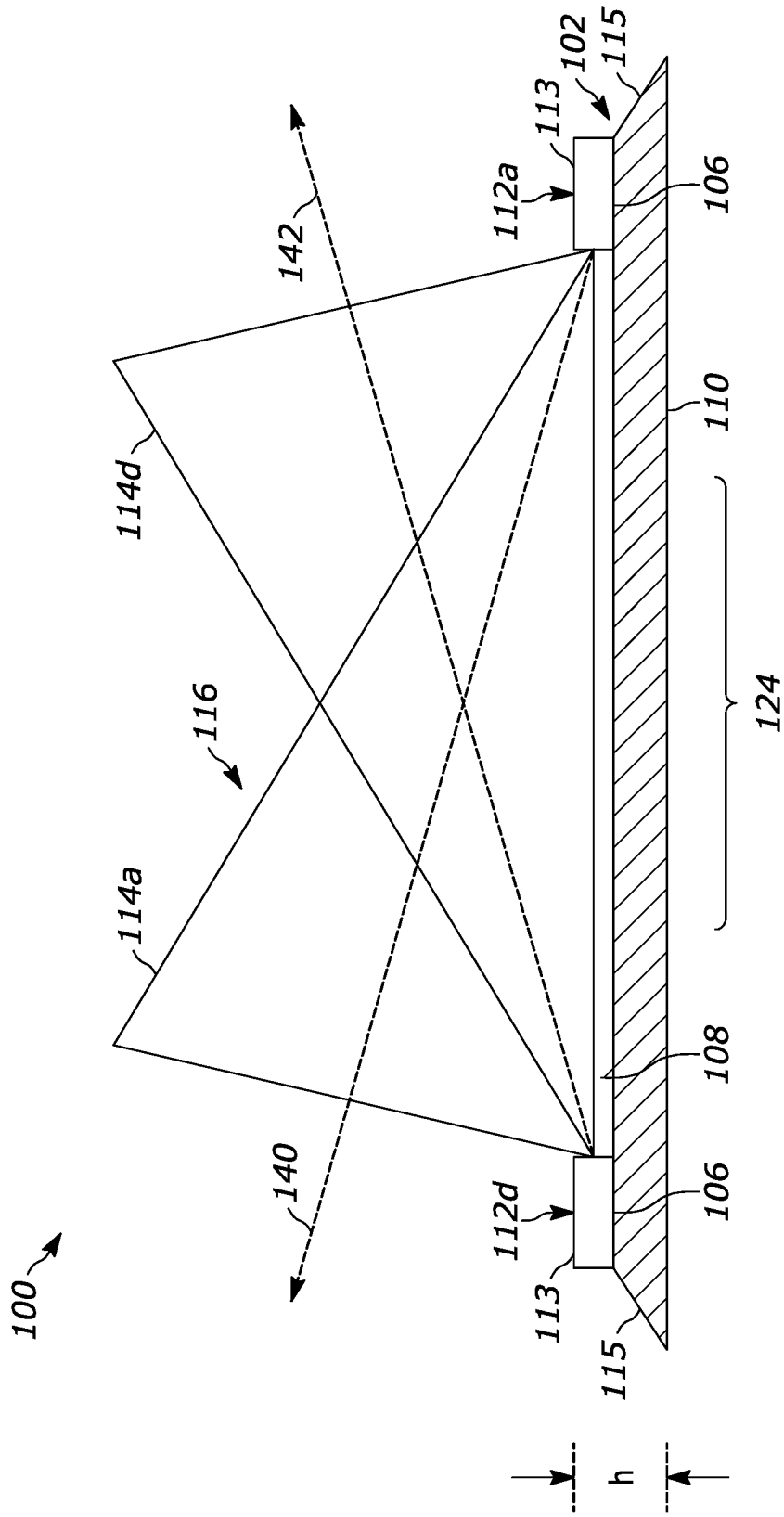
FIG. 4 illustrates a side elevation cross-sectional view of the low-profile imaging device of FIG. 1 and showing a cross-section of a resulting scan volume, in accordance with various embodiments.

In the illustrated example of FIGS. 1-3, the scan volume 116 is formed of the overlapping fields of view of the low-profile imagers 112, which are positioned in-plane relative to one another. The volumetric extent of the scan volume 116 above the scanning surface 118 may be determined by the dimensions of the frame structure 114 and location of imagers, as well as by a central axis of each respective field of view. The imaging device of claim 1, wherein the low-profile frame structure positions the plurality of imagers such that the respective field of view of each imager has a central axis that is no greater than 45° relative to the scanning surface. For example, FIG. 4 illustrates the imaging device cross section at the central point 122 and looking toward the edge 118. The field of view 114a of the imager 112a has a central axis 140 and the field of view of 114d of the imager 112d has a central axis 142, each of these axes 140 and 142 form an angle that is no greater than 45° relative to a plane parallel to the scanning surface 108.

Further, FIG. 4 illustrates an upper bound of the imaging device 100 as corresponding to an upper surface 113 of the imagers 112, and a lower bound as corresponding to the mounting surface 110, such that the height, h, is 5 inches or less, 4 inches of less, 3 inches or less, 2 inches or less, or 1 inch of less.

Figure 5A:
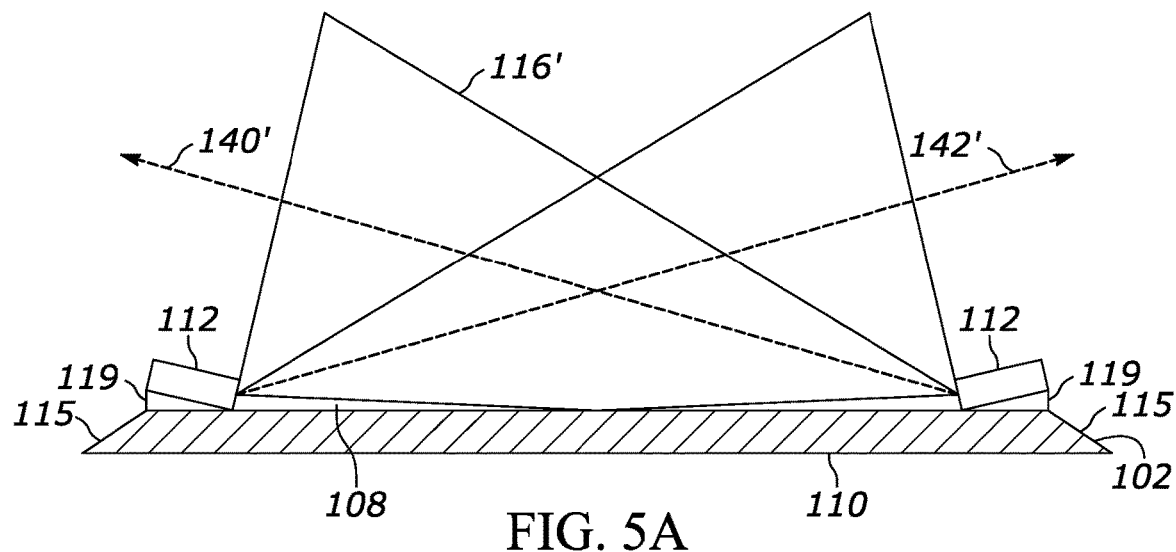
FIGS. 5A and 5B illustrate side elevation cross-sectional views of other example low-profile imaging devices with different scan volumes from that of FIGS. 1 and 4, in accordance with various embodiments.
Figure 5B:
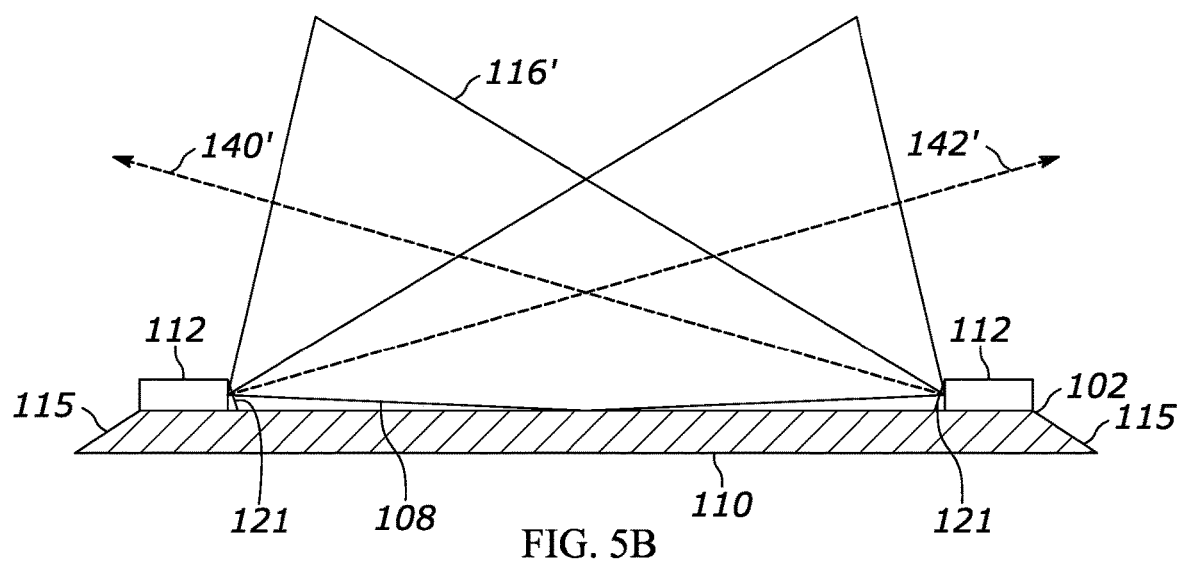

In the example of FIG. 4, the imagers 112 are positioned and/or configured such that the scan volume 116 has lower edge or lower plane 117 that is parallel to the scanning surface 108, at least over the central region 124. That lower edge or lower plane 117 is formed by a lower most extent of the overlapping of the fields of view of the respective imagers. In some examples, that lower most extent may deflect upward away from the scanning surface 108. In yet other examples, such as shown in FIGS. 5A and 5B, a lower portion of the scan volume impinges a scanning surface, at least at a portion of the central region 124. FIG. 5A illustrates a modified imaging device 100' similar to the device 100, where the imagers 112 are mounted on wedge-shaped platforms 119 that form at least part of the frame structure 104 and that tilt the respective central axes 140' and 142' such that the resulting scan volume 116' impinges the scanning surface 108 of the substrate structure 102. FIG. 5B illustrates another modified imaging device 100" similar to the device 100, where the imagers 112 are configured with deflector windows 121 that deflects the central axes 140" and 142" such that the scan volume 116' impinges the scanning surface 108. While FIG. 5A illustrates mounting platforms, any of the designs herein may include platforms (wedge shaped, substantially flat, or otherwise) for mounting imagers directly to a substrate structure or to a frame mounted directly to the substrate structure.

Further, whereas FIGS. 4, 5A, and 5B illustrate imagers positioned above a peripheral region of the imaging device, in other examples, imagers may be positioned to extend below a peripheral region. For example, the peripheral region 106 may correspond to a chamfer surface extending downwardly from a scanning surface or, as shown in FIGS. 4, 5A, and 5B, the peripheral region 106 may include a chamfer surface 115 extending therefrom.

Figure 6A:
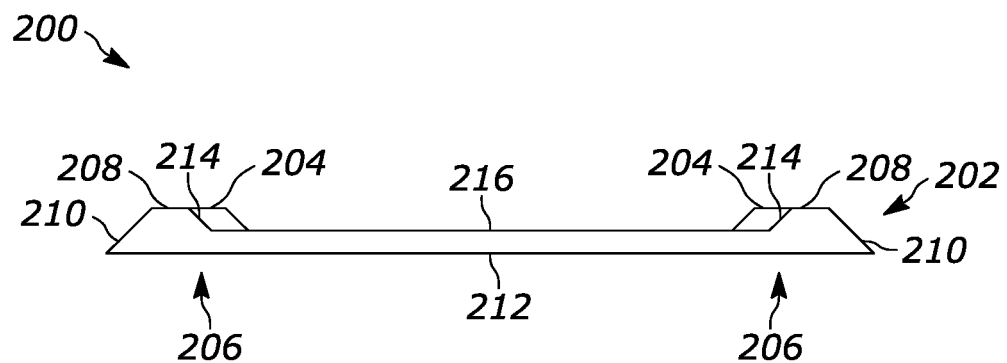
FIGS. 6A and 6B illustrate a side-elevation cross-sectional view and a perspective view, respectively, of another example low-profile imaging device, in accordance with various embodiments.
Figure 6B:
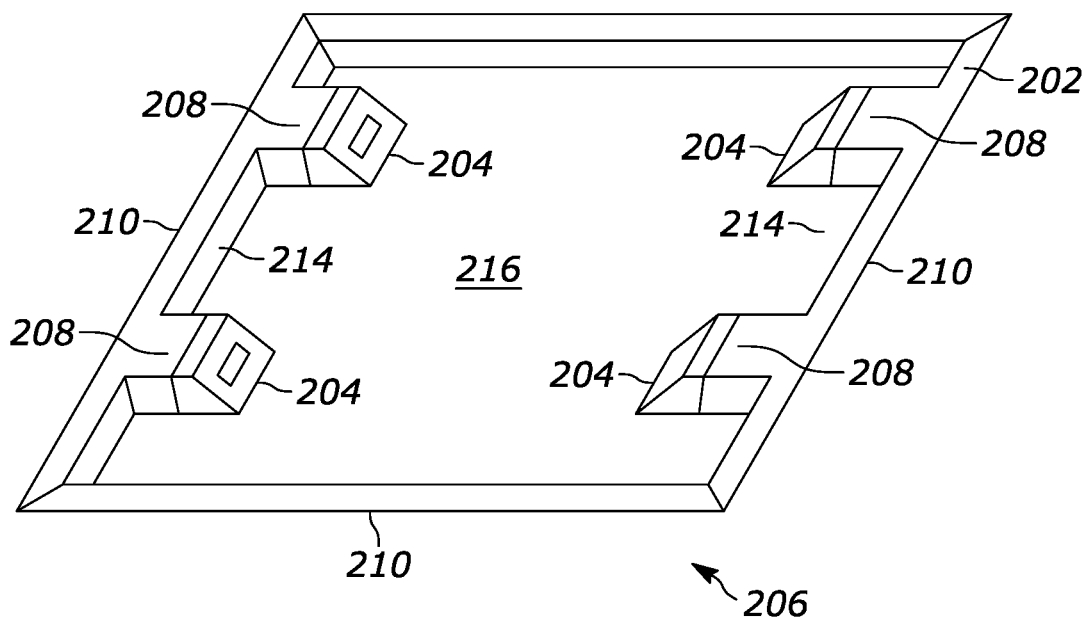

FIGS. 6A and 6B illustrate an imaging device 200 formed of low-profile substrate structure 202, shown, and a low-profile frame structure (not shown) that positions imagers 204 such that the imagers 204 extend below an upper surface 208 of a peripheral region 206 of the imaging device 200. In the illustrated example, the peripheral region 206 includes a chamfer surface 210 extending downwardly from the upper surface 208 to a mounting surface 212 and another chamfer surface 214 extending downwardly from the upper surface 208 toward a scanning surface 216. That is, the inner chamfer surface 214 serves as a mounting surface of the imagers 204 angling them for forming a desired scan volume, in accordance with other examples herein. Depending on the type and shape of the imagers, in some examples, a right angle mounting surface may be used instead of mount the imagers below the peripheral region. Further, in some examples, the imagers extend only partially below the peripheral region.

Figure 7:
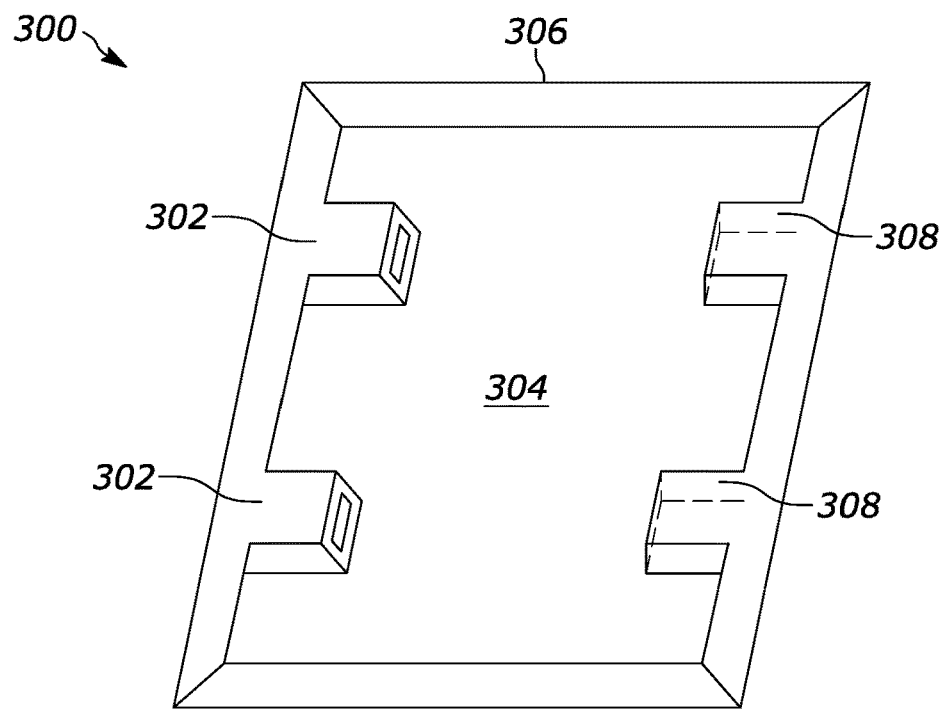
FIG. 7 illustrates a perspective view of another example low-profile imaging device, in accordance with various embodiments.

The imaging device 200 of FIGS. 6A and 6B includes imagers 202 positioned below an upper surface of a peripheral region but above a scanning surface. FIG. 7 illustrates another example low-profile imaging device 300, where imagers 302 (only two of which are shown in place for explanation purposes) are positioned below a scanning surface 304 of a low-profile substrate structure 306. The imaging device 300 is an example configuration in which the imagers 302 are positioned in recessed chambers 308 (only two of which are shown for explanation purposes) extending below the scanner surface 304. In the illustrated example, the recessed chambers 308 are positioned at different locations coinciding with or adjacent to a peripheral region 310, and each chamber 308 includes an optical window not shown formed of plastic or glass or free space, where the fields of view of the respective imagers extend through the windows.

Figure 8:
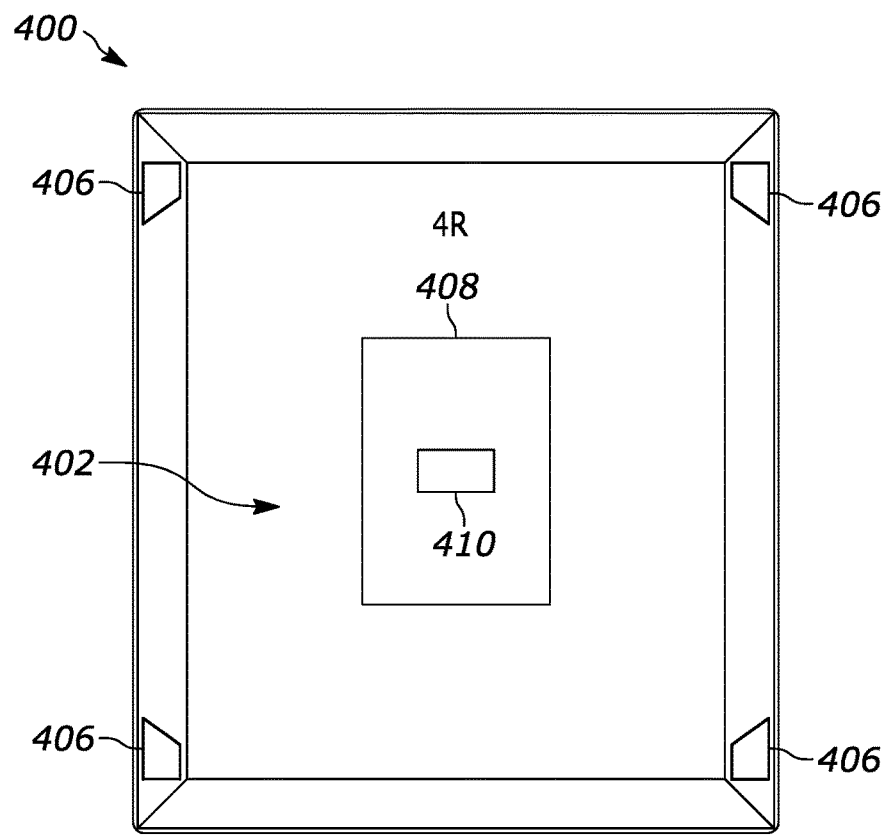
FIG. 8 illustrates a plan view of an example low-profile imaging device having an optical window, in accordance with various embodiments.

In some examples, it may be advantageous to have an additional vertically directed imager to capture imagers of an object. Conventional bi-optic imaging devices have a horizontally directed imager and a vertically directed imager. However, as noted above, bi-optic imaging devices can be bulky and limit access to a scan volume. FIG. 8, by contrast, illustrates a low-profile imaging device 400 formed of a low-profile substrate structure 402 and a low-profile frame structure 404 containing a plurality of imagers 406. Unlike the imaging device 100 in which the substrate structure 102 is a continuous structure with no optical opening, the substrate structure 402 includes an optical opening 408 at a central region. That optical opening 408 may be a free space opening or a transparent window, such as formed of scratch resistance glass. Optionally, and as shown, the at least one additional imager 410 may be positioned relative to that optical opening 408 such that a field of view of the additional imager passes through the optical opening for capturing imaging data corresponding to at least a portion of a scanning surface 412. The result is a scan volume that is formed of the fields of view of in-plane imagers 406 and an out-of-plate vertically directed imager 410.

Figure 9:
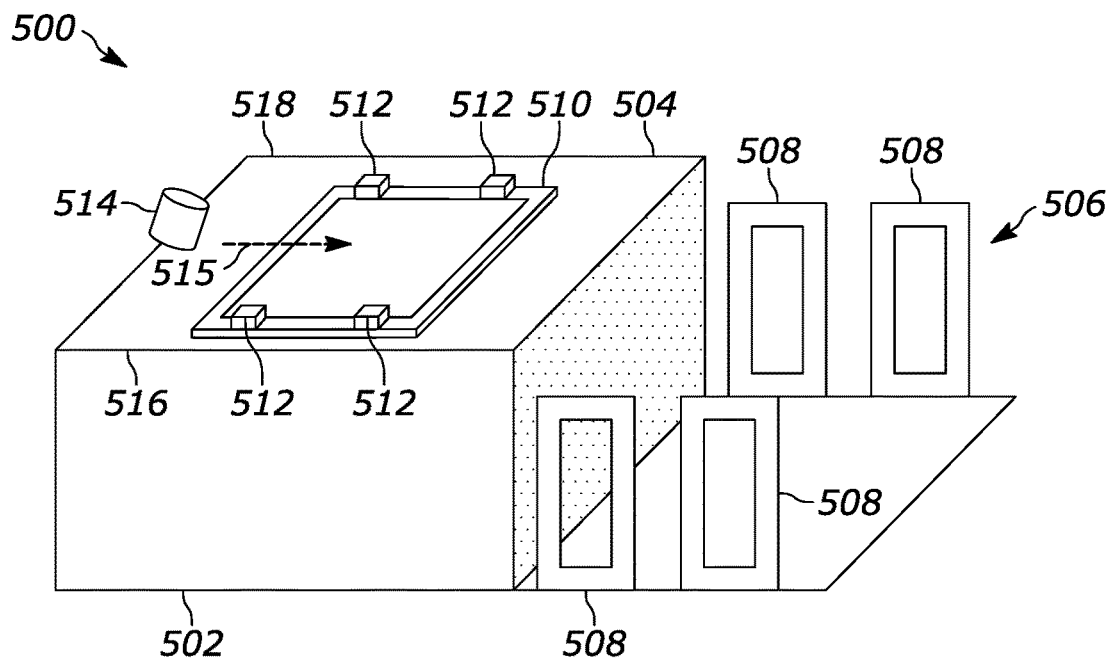
FIG. 9 illustrates a perspective view of an example low-profile imaging device deployed at an example self-checkout station, in accordance with various embodiments.

Among the advantages of example low-profile imaging devices herein, the devices may be placed in otherwise familiar existing environments, creating greater user accessibility and efficiency of operation. FIG. 9, for example, illustrates a retail environment, in particular a self-checkout station 500 having a platform 502 with a working surface 504 on or above which objects may be moved for scanning, and a bagging area 506 having features 508 (divider walls, bag holders, etc.) for facilitating bagging of objects. A low-profile imaging device 510 is mounted in the work surface 504 and oriented such that a scan volume formed by a plurality of imagers 512 allows for efficient scanning of an object 514 generally moving along a scan direction 515, whether the user is on first side 516 of the platform 502 or a second, opposite side 518 thereof.

Figure 10:
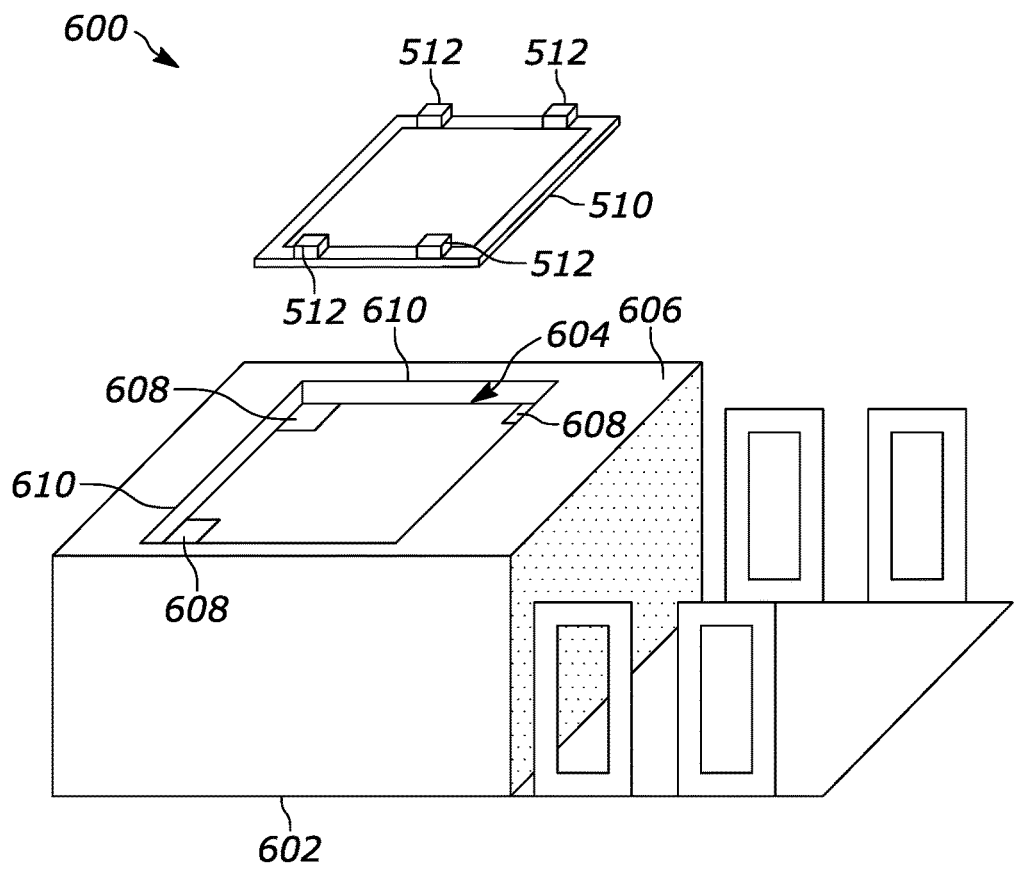
FIG. 10 illustrates a perspective view of another example low-profile imaging device deployed in a recessed manner at a self-checkout station, in accordance with various embodiments.
Figure 11:
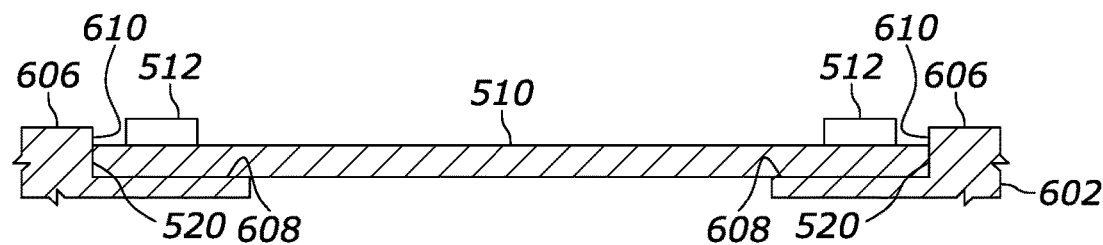
FIG. 11 illustrates a side-elevation cross-sectional view of the low-profile imaging device of FIG. 10 recessed in a platform of the self-checkout station, in accordance with various embodiments.

While FIG. 9 illustrates an example self-checkout station in which a low-profile imaging device is mounted on work surface that is an upper surface of a platform, FIG. 10 illustrates an example self-checkout station 600, in which the low profile imaging device 510 may be positioned within a recess 604 of a platform 602, thereby allowing the imaging device 510 to provide a continuous surface with an upper surface 606 of the platform 602. In the illustrated example, the recess 604 includes recessed work surfaces 608 upon which a mounting surface of the imaging device 510 are mounted. FIG. 11 illustrates a cross-section view of a portion of the imaging device 510 in which a mounting surface 514 is positioned on the working surface 608, where the work surface is shown as platforms at respective corners of the recess 604. Alternatively, in other examples, a continuous surface (or any other suitable pattern of surface) across the recess bottom may formed the work surface. As shown in greater detail in FIG. 11, low-profile imaging devices herein may be formed without a chamfer or other lead-in surface. The imaging device 510 has a flush edge 520 parallel to an retaining wall 610 defining the perimeter of the recess 604. The low-profile substrate structure of the imaging device 510 may be sized to engage the flush edge 520 with that retaining wall 610 during operation or sized with a spacing distance between the two to allow for placement and removal from the recess 604. In other examples, the flush edge 520 may be slightly pitched to allow a power portion thereof to engage the retaining wall 610. In yet other examples, the imaging device 510 includes any other suitable edge pattern to facilitate placement and/or removal into the recess 604.

Figure 12:
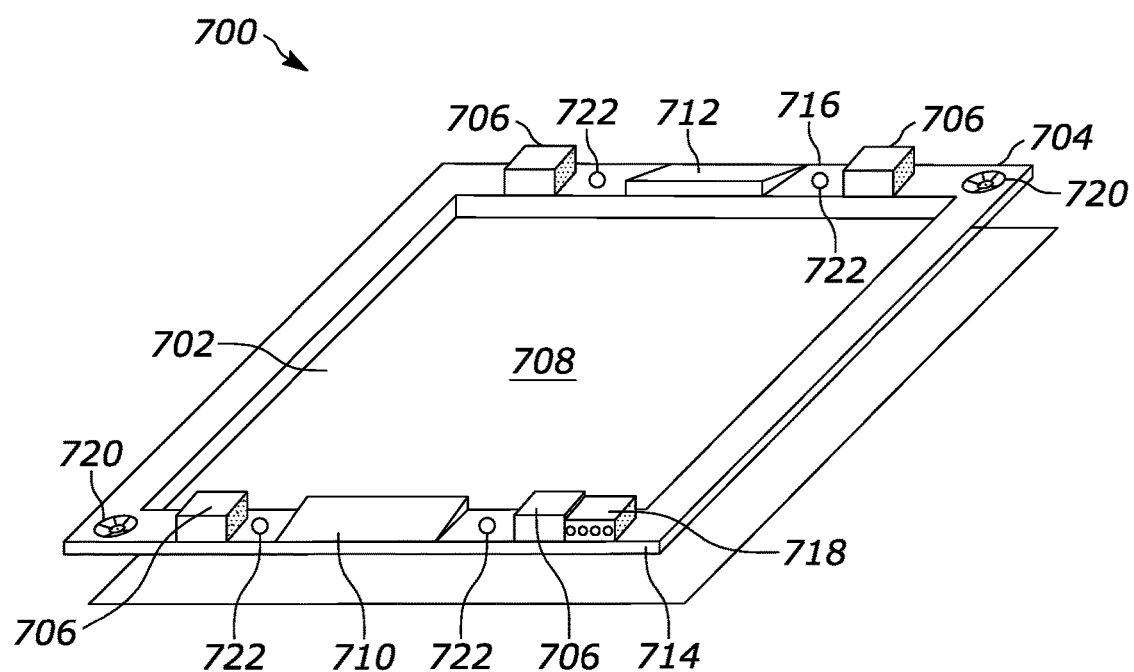
FIG. 12 illustrates a perspective view of an example low-profile imaging device having integrated digital displays, in accordance with various embodiments.

In various examples, one or both of the low-profile substrate structure and the low-profiled frame structure may include electronics facilitating operation and user functionality. FIG. 12, for example, illustrates an example low-profile imaging device 700 including a low-profile substrate structure 702 and a low-profile frame structure 704 having a plurality of imagers 706 having fields of view that collectively define a scan volume above a scanning surface 708. In the illustrated example, the low-profile substrate structure 702 sits within the boundaries of low-profile frame structure 704 where the two are engaged at a peripheral region of the former, providing an example of low-profile frame structure being integrally formed with a low-profile substrate structure. Of course, any of the other configurations illustrated or otherwise contemplated herein may be used. Examples include FIGS. 1-3 or other configurations where the low-profile frame structure is positioned on the low-profile substrate structure.

The low-profile frame structure 704 includes two user digital displays 710 and 712, each tilted with respect to the scanning surface 708 and each positioned to display digital information to a user positioned at respective edges of the 714 and 716 of the imaging device 700. The displays 710 and 712 may be controlled by an external imaging processor (not shown) connected to the imaging device 700 through a connector panel 718 that may include a data port having data connectors, such as Scale, Auxiliary Scanner, Vision Camera Output, Scale Display, etc., and power connectors, such as USB, Barrel Jack, etc., for connecting to an external power supply. The connector panel 718, therefore, may be connected to each of the imagers 706 through electrical connections (not shown) embedded within the frame structure 704 for powering and controlling operation of each and for collecting captured imaged data from each and communicating that image data to an external imaging processor. The low-profile frame structure 704 may further include one or more speakers 720, also communicatively coupled to the connector panel 718, for providing an audible response to a user, such as an audible instruction, confirmation of a successful object scan, or other audible information. Further, one or more electronic visual indicators 722, such as a light emitting diode (LED) may be provided on the frame structure 704 and similarly communicatively coupled to the connector panel 718. As with other designs herein, the connect panel 718, the displays 710/712, the speakers 720, and the visual indicators 722, may all be sized such that the distance between the upper most extent of these components and the lowest most extent of the imaging device 700 (i.e., the mounting surface) satisfies the definition of 'low-profile' as provided herein.

Figure 13:
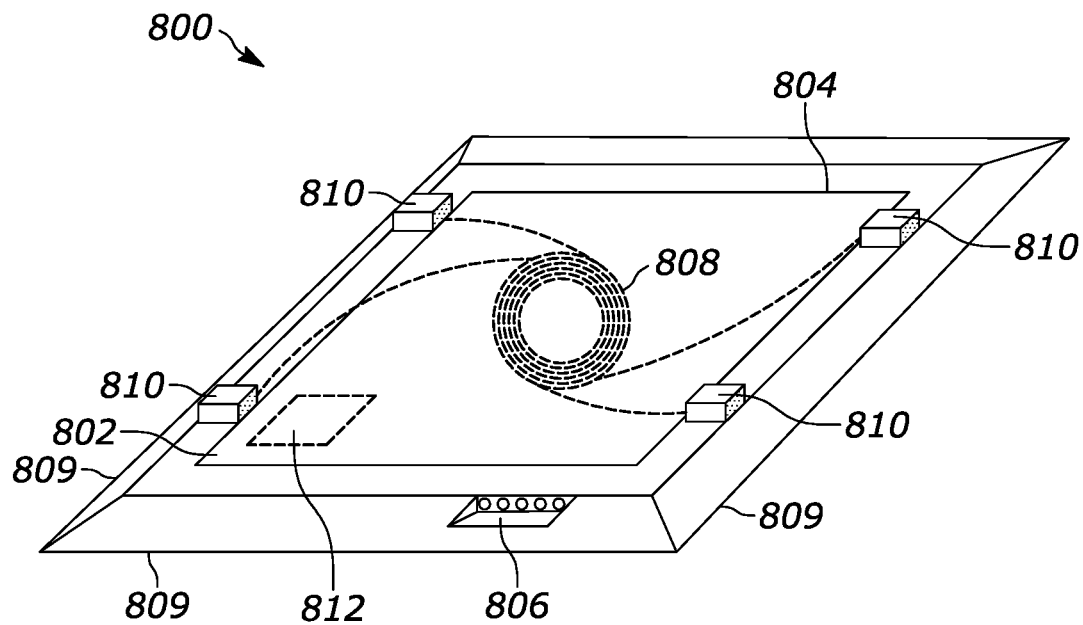
FIG. 13 illustrates a perspective view of an example low-profile imaging device having an integrated power supply, in accordance with various embodiments.

FIG. 13 illustrates another example low-profile imaging device 800, in which a low-profile frame structure 804 is integrally formed with a low-profile substrate structure 802 and includes connector panel 806 for sending image data to and receiving electronics instructions from an external imaging processor (not shown). In this configuration, the frame structure 804 contains chamfer surfaces 809 allowing for a smooth transition to a work surface (not shown) when deployed for object scanning. In the illustrated example, a power supply 808 is embedded within the low-profile substrate structure 802 and connected to each imager 810 for providing current to power the same. In the illustrated example, that power supply 808 is an inductive power supply formed of one or more charge coils that may be inductively charged, for example, when in proximity to a charging element embedded within a work surface upon which the imaging device 800 is to be placed. That is, another advantage of the low-profile designs herein is the ability to include a wireless charging power supply. In other examples, the low-profile substrate structure 802 may include a battery powered power supply.

It may be desirable to integrate communication devices, sensors, or other electronic devices with the low-profile imaging devices herein. In the example of FIG. 13, the imaging device 800 includes an electronic article surveillance antenna 812 embedded in the low-profile substrate structure 802. The electronic article surveillance antenna 812 may be a radio frequency identification (RFID) transceiver, a near field communication (NFC) device, or any RF transceiver device such as a BLUETOOTH® transceiver, a IEEE 802.11a/b/c/g (WIFI®) transceiver, or other communication device. The antenna 812 may be communicatively coupled to a control panel (not shown) within the imaging device for receiving power and for communicating collected data.

Figure 14:
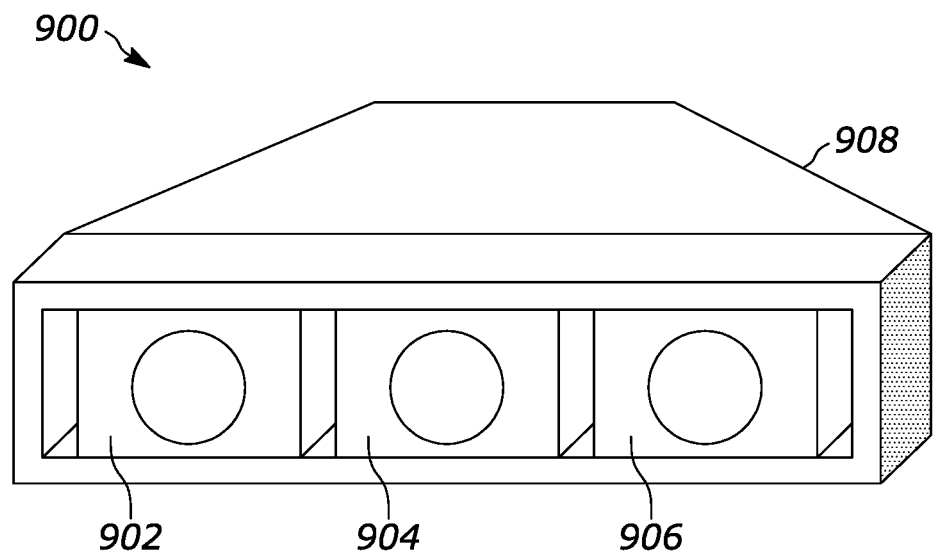
FIG. 14 illustrates a perspective view of an example imager as may be used in any of the low-profile imaging devices herein and having an imager module, an aimer module, and an illumination module, in accordance with various embodiments.

In any of the imaging devices herein, the imagers herein may be any suitable two-dimensional or three-dimensional imagers. Further, as shown in the example of FIG. 14, any of the suitable imagers 900 may be a low-profile assembly that includes an imager 902 for capturing image data over a field of view, an aimer 904 for generating an aiming pattern (dot, line, or other pattern) in that field of view, and/or an illumination source 906 for illuminating the field of view, all contained with a low-profile housing structure 908. A data connector panel (not shown) may extend out of a back surface or bottom surface of the housing structure 908.

Figure 15A:
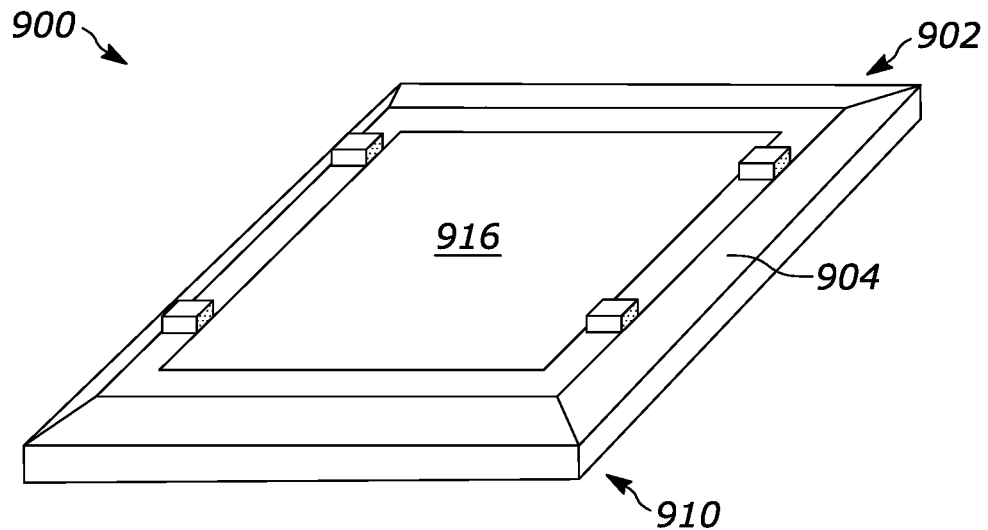
FIGS. 15A and 15B illustrate perspective views of a multifunction scanning assembly having a low-profile imaging device mounted to weigh platter station, in accordance with various embodiments.
Figure 15B:
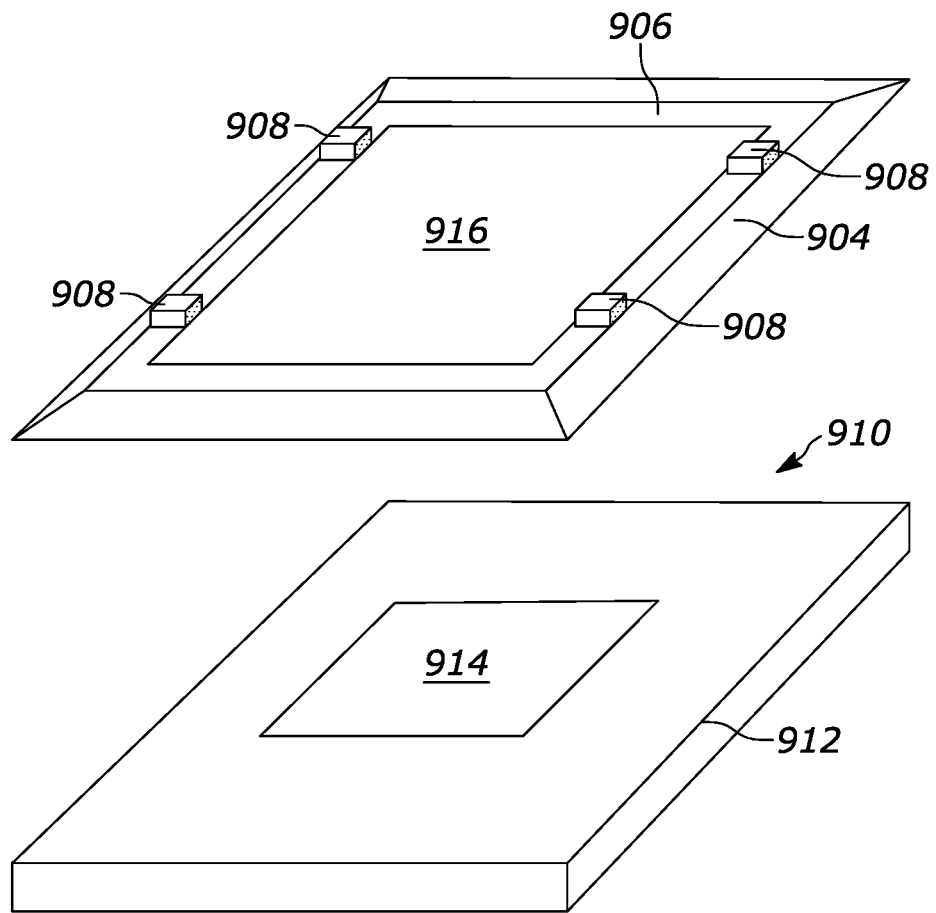

Another advantage of a low-profile imaging device herein is the ability to integrate with a weigh platter or similar weighing structures. Such integrated assemblies, for example, may advantageously sit a weigh platter in a recess of a platform, while maintaining a low-profile substrate structure flush with an upper surface of that platform or resting slightly above that upper surface. FIGS. 15A and 15B, illustrates a multifunction scanning assembly 900 in which a low-profile imaging device 902 formed of a low-profile substrate structure 904 and a low-profile frame structure 906 (with imagers 908) is mounted on top of a weigh platter station 910 formed of a frame 912 and an internal scale assembly 914. Thus, in this configuration, a mounting surface of the imaging device 902 rests on an upper surface of the weigh platter station 910, with the scale assembly 914 at least partial extending over a central region of the substrate structure 904, i.e., at least partially underneath a scanning volume formed by the imagers 908, and preferably, entirely underneath the scanning volume when viewed from above. In any event, the scale assembly 914 is configured for sensing the weight of objects placed on a scanning surface 916 of the low-profile substrate structure 904.

Figure 16:
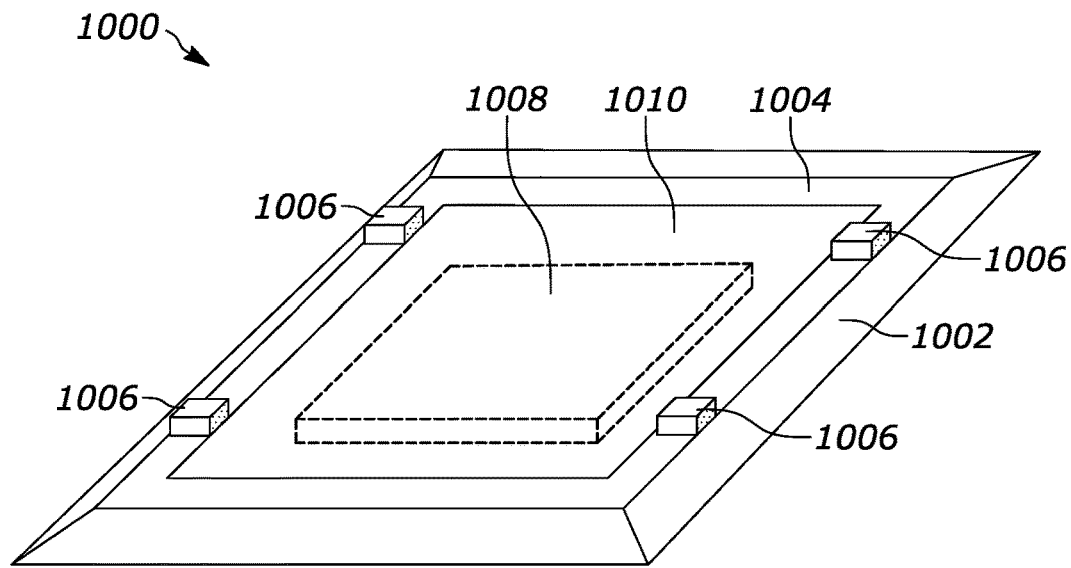
FIG. 16 illustrates a perspective view of a multifunction scanning assembly having a low-profile imaging device with integrated weigh platter station, in accordance with various embodiments.

FIG. 16 illustrates another low-profile imaging device 1000 that is a multifunctional scanning assembly. The imaging device 1000 includes a low-profile substrate structure 1002 and a low-profile frame structure 1004 with imagers 1006. The imaging device further includes a weigh sensor assembly 1008 integrated into the substrate structure 1002 below a scanning surface 1010 and coinciding with a central region to generate weigh data in response to placement of an object on the upper surface of the substrate structure 1002. The weigh sensory assembly 1008 may contain one or more weigh sensors (e.g., pressure sensors) and in some examples may be an array of weigh sensors or a dedicated scale assembly. In various examples, weigh sensors, scale assembly, integrated pressure sensor(s), etc. may be communicatively coupled to a control panel (not shown) within the imaging device for receiving power and for communicating collected data.

Figure 17:
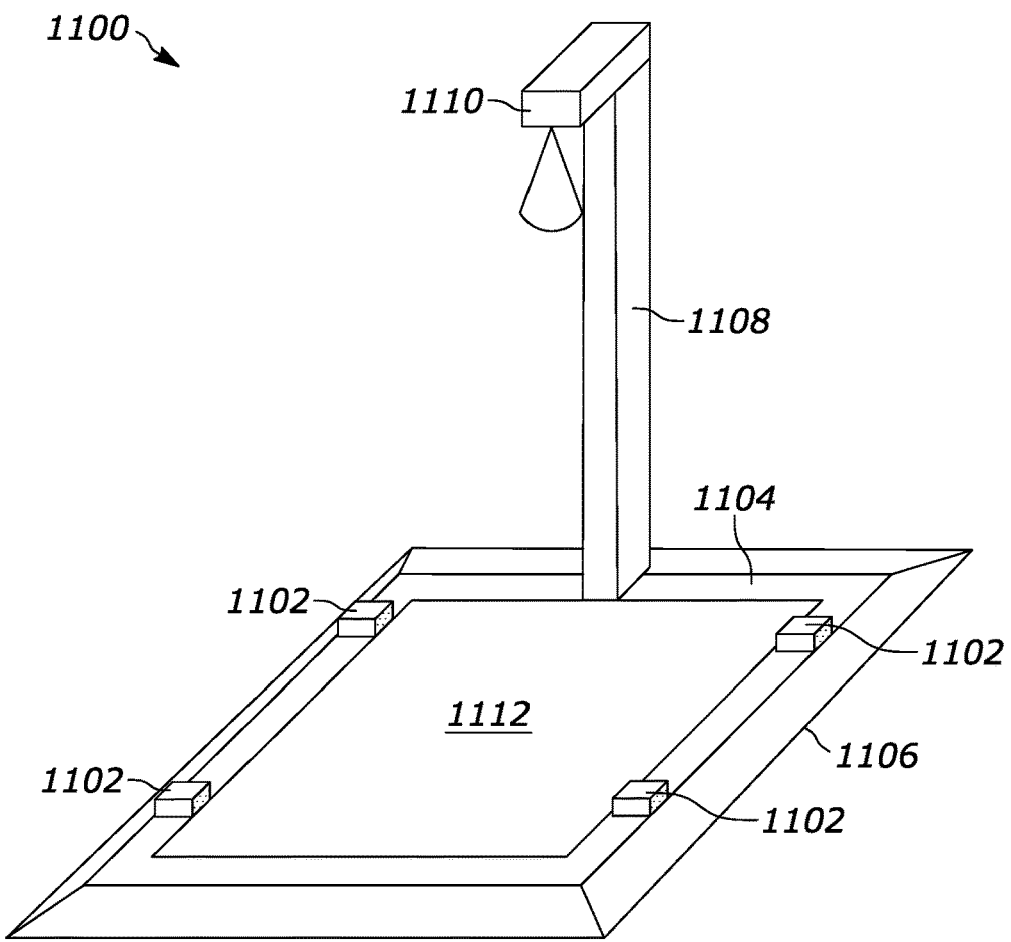
FIG. 17 illustrates a perspective view of a low-profile imaging device with a mounted external imager, in accordance with various embodiments.

In various examples, the low-profile imaging devices herein may be integrated with external imagers or external illumination sources. FIG. 17 illustrates an example imaging device 1100, having a plurality of imagers 1102 positioned at a periphery 1104 of a low-profile substrate structure 1106, where a mounting arm assembly 1108 engages the structure 1106 extended vertically therefrom. In some examples, the arm assembly 1108 mounts an external camera 1110 directed downward toward a scanning surface 1112 of the structure 1106 to capture image data of the scanning surface. In some examples, that external camera 1110 further includes an external illumination source directed toward the scanning surface 1112 to illuminate at least a portion of the scanning surface 1112 and coinciding with the scan volume created by the imagers 1102. It yet other examples, the arm assembly 1108 may mount only an illumination source. As with the imagers in the other imaging-devices herein, the external imager 1110 may be a 2D imager, such as photo-realistic camera for capturing, sensing, or scanning 2D image data, or a three-dimensional (3D) imager such as a 3D camera for capturing, sensing, or scanning 3D image data. The 3D camera may include an Infra-Red (IR) projector and a related IR camera for capturing, sensing, or scanning 3D image data/datasets.

It will be appreciated that aspects related to the control and use of the various imaging devices herein, e.g., for image data capture, image data transmission, indicia identification, indicia decoding, payload transmission, etc. may be performed by known methods through software and/or hardware, including by not limited to through the use of logic circuits, microprocessors, controllers, and/or any suitable type of processor and through memories storing machine-readable instructions that may be executed by the same to achieve the desired functions.

The above description may refer to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging device comprising:
a low-profile substrate structure having a mounting surface to be placed on a substantially flat work surface and having an upper surface, opposite the mounting surface, the upper surface having a central region positioned for scanning of an object; and
low-profile frame structure coinciding with a peripheral region of the low-profile substrate structure, the low-profile frame structure comprising,
a plurality of imagers each having a respective field of view, the low-profile frame structure positioning each imager such that each respective field of view is inwardly facing toward the central region of the upper surface and such that a scan volume extending above the central region is defined from the overlapping respective fields of view,
where the low-profile frame structure positions at least some of the plurality of imagers at opposing sides of the low-profile substrate structure,
wherein the mounting surface of the low-profile substrate structure and an upper bound of the low-profile frame structure define an upper bound and a lower bound of the imaging device,
a user display integrated into the low-profile substrate structure or the low-profile frame structure.

2. The imaging device of claim 1, wherein the low-profile frame structure positions the plurality of imagers such that the scan volume covers a majority of the upper surface centered about a center point of the central region when viewed from above the imaging device.

3. The imaging device of claim 1, wherein the low-profile frame structure positions the plurality of imagers such that the scan volume extends substantially the length of the upper surface in a transverse direction and being confined from extending substantially the width of the upper surface in the lateral direction.

4. The imaging device of claim 1, wherein the distance between the upper bound and the lower bound of the imaging device is less than 2 inches.

5. The imaging device of claim 1, wherein the distance between the upper bound and the lower bound of the imaging device is less than 1 inch.

6. The imaging device of claim 1, wherein the low-profile frame structure positions the plurality of imagers such that the respective field of view of each imager has a central axis that is no greater than 45° relative to the upper surface.

7. The imaging device of claim 1, wherein the low-profile frame structure is positioned on the low-profile substrate structure.

8. The imaging device of claim 1, wherein the low-profile frame structure is integrally formed with the low-profile substrate structure.

9. The imaging device of claim 1, wherein the low-profile frame structure positions the plurality of imagers above the upper surface.

10. The imaging device of claim 1, wherein the low-profile frame structure positions the plurality of imagers extending at least partially below the upper surface.

11. The imaging device of claim 1, wherein the low-profile profile substrate structure in substantially rectangular in shape and wherein the low-profile frame structure positions at least some of the plurality of imagers at respective corners of the low-profile substrate structure.

12. The imaging device of claim 1, wherein the low-profile frame structure positions the plurality of imagers such that imagers on a side of the low-profile frame structure are angled with respective to one to prevent dead scan angles during object scanning over the scan volume.

13. The imaging device of claim 1, wherein the plurality imagers comprises at least three imagers.

14. The imaging device of claim 13, wherein the plurality imagers comprises four imagers.

15. The imaging device of claim 1, wherein the low-profile substrate structure has no imager and no optical opening at the central region.

16. The imaging device of claim 1, wherein the low-profile substrate structure has an optical opening coinciding with the central region.

17. The imaging device of claim 16, further comprising at least one additional imager positioned below the optical opening and having a field of review passing through the optical opening and at least partially overlapping the scan volume extending above the central region.

18. The imaging device of claim 1, wherein the low-profile substrate structure is a flexible structure.

19. The imaging device of claim 1, wherein the low-profile substrate structure is a substantially rigid structure.

20. The imaging device of claim 1, wherein the scan volume has a lower edge that is parallel to the upper surface at the central region.

21. The imaging device of claim 1, wherein the scan volume has a lower edge that impinges the upper surface at the central region.

22. The imaging device of claim 1, wherein at least one of the plurality of imagers is a 3D imager.

23. The imaging device of claim 1, wherein each of the plurality of imagers comprises an illumination source to illuminate the respective field of view.

24. The imaging device of claim 1, wherein the user display is tilted with respect to the upper surface of the low-profile substrate structure.

25. The imaging device of claim 1, further comprising a plurality of user displays integrated into the low-profile substrate structure, each positioned at an opposing edge of the low-profile substrate structure.

26. The imaging device of claim 1, further comprising a speaker integrated into the low-profile substrate structure.

27. The imaging device of claim 1, further comprising an electronic visual indicator integrated into the low-profile substrate structure.

28. The imaging device of claim 27, wherein the electronic visual indicator comprises a light emitting diode (LED).

29. The imaging device of claim 1, further comprising a power supply embedded within the low-profile substrate structure and connected to provide current to each of the plurality of imagers.

30. The imaging device of claim 29, wherein the power supply is a wireless charging power supply.

31. The imaging device of claim 29, wherein the power supply comprises one or more charge coils.

32. The imaging device of claim 29, wherein the power supply is a battery powered power supply.

33. The imaging device of claim 22, further comprising a connector panel at an edge of the low-profile substrate structure, the connector panel coupled to each of the plurality of imagers for receiving respective captured imager data.

34. The imaging device of claim 1, further comprising an electronic article surveillance antenna embedded in the low-profile substrate structure.

35. The imaging device of claim 34, wherein the electronic article surveillance antenna is an RFID transceiver.

36. The imaging device of claim 1, further comprising one or more weigh sensors positioned to generate weigh data in response to placement of the object onto the upper surface of the low-profile substrate structure.

37. The imaging device of claim 36, wherein the one or more weigh sensors comprise an array of pressure sensors or where the one or more weigh sensors are within a scale assembly positioned under the upper surface.

38. The imaging device of claim 1, further comprises an external camera mounted to the low-profile substrate structure through a mounting arm assembly and mounted above and directed downward toward the upper surface to capture image data of the upper surface.

39. The imaging device of claim 1, further comprises an external illumination source mounted to the low-profile substrate structure through a mounting arm assembly and mounted above and directed toward the upper surface to illuminate at least a portion of the upper surface and coinciding with the scan volume.

* * * * *